United States Patent
Rimmer et al.

(10) Patent No.: US 11,034,850 B2
(45) Date of Patent: Jun. 15, 2021

(54) MULTIPURPOSE SHRINK SLEEVE PRINTING INK

(71) Applicant: SUN CHEMICAL CORPORATION, Parsippany, NJ (US)

(72) Inventors: David Jason Rimmer, Leyland (GB); Nicholas Matthew Crandon, Sale (GB)

(73) Assignee: Sun Chemical Corporation, Parsippany, NJ (US)

( * ) Notice: Subject to any disclaimer, the term of this patent is extended or adjusted under 35 U.S.C. 154(b) by 352 days.

(21) Appl. No.: 16/086,930

(22) PCT Filed: Apr. 5, 2017

(86) PCT No.: PCT/US2017/026051
§ 371 (c)(1),
(2) Date: Sep. 20, 2018

(87) PCT Pub. No.: WO2917/176826
PCT Pub. Date: Oct. 12, 2017

(65) Prior Publication Data
US 2020/0062975 A1 Feb. 27, 2020

Related U.S. Application Data

(60) Provisional application No. 62/318,833, filed on Apr. 6, 2016.

(51) Int. Cl.
*C09D 11/102* (2014.01)
*B41M 1/04* (2006.01)
(Continued)

(52) U.S. Cl.
CPC .......... *C09D 11/102* (2013.01); *B41M 1/04* (2013.01); *B41M 1/30* (2013.01); *C08L 1/08* (2013.01);
(Continued)

(58) Field of Classification Search
None
See application file for complete search history.

(56) References Cited

U.S. PATENT DOCUMENTS 5,780,200 A  7/1998  Kitaguchi et al.
9,139,716 B2 *  9/2015  Crandon ................ C09D 11/03
(Continued)

FOREIGN PATENT DOCUMENTS

EP  1 493 762 A1  1/2005
EP  1 493 762 B1  5/2007
(Continued)

OTHER PUBLICATIONS

English translation of JP 2011/148302, Aug. 2011; 28 pages.*
(Continued)

*Primary Examiner* — Helene Klemanski
(74) *Attorney, Agent, or Firm* — Marian E. Fundytus; Ostrolenk Faber LLP.

(57) ABSTRACT

Described herein is a printing ink or coating composition that includes: (a) one or more elastomeric polyurethane resins with amine functionality having a glass transition temperature of about −45° C. to about −70° C.; (b) one or more acrylic resins based on a methacrylate/styrene copolymer with a glass transition temperature of about 45° C. to about 110° C.; (c) one or more nitrocellulose binders; (d) one or more solvents; and (e) optionally, one or more waxes and/or one or more colorants. The inks and coating compositions are well suited for printing onto shrink sleeve label substrates, such as by flexographic and gravure printing. The inks and coatings provide exceptional printability and resistance to chemicals, to softening, to re-wetting, and to set-off.

19 Claims, 2 Drawing Sheets

(51) Int. Cl.
    *B41M 1/30*      (2006.01)
    *C08L 1/08*      (2006.01)
    *C08L 25/14*      (2006.01)
    *C08L 75/08*      (2006.01)
    *C08L 75/12*      (2006.01)
    *C09D 11/106*      (2014.01)
    *C09D 11/08*      (2006.01)

(52) U.S. Cl.
    CPC ............... *C08L 25/14* (2013.01); *C08L 75/08* (2013.01); *C08L 75/12* (2013.01); *C09D 11/106* (2013.01)

(56) References Cited

U.S. PATENT DOCUMENTS

| | | | |
|---|---|---|---|
| 9,976,057 B2 * | 5/2018 | Schottland | C09D 201/00 |
| 2005/0208440 A1 | 9/2005 | Suzuki et al. | |
| 2006/0106162 A1 | 5/2006 | Yamaguchi | |
| 2006/0246243 A1 | 11/2006 | Eugene et al. | |
| 2010/0272968 A1 | 10/2010 | Metla | |
| 2014/0220322 A1 | 8/2014 | Wu et al. | |
| 2014/0357766 A1 | 12/2014 | December et al. | |
| 2015/0218405 A1 | 8/2015 | Iwata et al. | |
| 2016/0200942 A1 * | 7/2016 | Schottland | C09D 101/08 428/195.1 |
| 2020/0040203 A1 * | 2/2020 | Romanato | C08G 18/1808 |

FOREIGN PATENT DOCUMENTS

| | | | |
|---|---|---|---|
| JP | 2001/031899 A | * | 2/2001 |
| JP | 2004-238578 A | | 8/2004 |
| JP | 2008/163231 A | * | 7/2008 |
| JP | 2011-148302 A | | 8/2011 |
| JP | 2011-153172 A | | 8/2011 |
| JP | 2014/034159 A | * | 2/2014 |
| WO | WO 2005/058274 A1 | | 6/2005 |
| WO | WO 2009/065502 A1 | | 5/2009 |

OTHER PUBLICATIONS

English translation of JP 2008/163231, Jul. 2008; 22 pages.*
English translation of JP 2001/031899, Feb. 2001; 11 pages.*
English translation of JP 2014/034159, Feb. 2014; 38 pages.*
International Search Report issued in International Application No. PCT/US2017/026051, dated Jun. 26, 2017.
Written Opinion of the International Searching Authority issued in International Application No. PCT/US2017/026051, dated Jun. 26, 2017.
TAGA (Proceedings of the Technical Association of the Graphic Arts):2006, 409-418.
Extended European Search Report issued in counterpart EP application No. 17779703.2, dated Nov. 7, 2019.
International Preliminary Report issued in PCT/US2017/026051 dated Oct. 9, 2018.

* cited by examiner

MULTIPURPOSE SHRINK SLEEVE PRINTING INK

The present application is a § 371 National Phase application based on PCT/US2017/026051 filed Apr. 5, 2017, which claims the benefit of U.S. Provisional Application No. 62/318,833, filed Apr. 6, 2016 the subject matter of each of which is incorporated by reference in their entirety.

FIELD OF THE INVENTION

The present disclosure is directed to a multipurpose flexographic and gravure ink system that comprises an acrylic resin, a polyurethane resin, a cellulose resin, an organic solvent, and pigments. The multipurpose flexographic and gravure ink system is suitable for printing onto various substrates, such as for example, market grades of shrinkable films including oriented polypropylene (OPP), polyvinylchloride (PVC), oriented polystyrene (OPS), polyethylene terephthalate (PET) and polylactic acid (PLA) film used in constructing a wide range of shrinkable sleeve products. Such shrink sleeve product may activate at a temperature of about 55° C. to about 65° C., and may shrink up to 75% in the machine transverse direction. The inks described herein are suitable for use on films that activate in this range, and also at temperatures outside this range, or on labels that do not heat activate.

BACKGROUND OF THE INVENTION

Nitrocellulose/polyurethane (NC/PU) solvent based ink combinations are used in printing labels for many commercial products. However, such ink combinations may deteriorate and degrade when they come into contact with the products packaged in the containers that are labeled with the inks. For example, surfactant-containing cleaning solutions, liquid soaps, and laundry products may degrade the ink on the label when these products spill out of the container and contact the ink. The ink may then leach out of the label and commingle with the spilled product, which may complicate the cleanup of the spill and render the label visually unacceptable, e.g., unreadable.

Further, seaming solvents used in shrink sleeve manufacturing may re-dissolve NC/PU solvent based ink combinations, resulting in undesirable set-off or ink blocking. The seam weld area increases the height of the printed construction where the print is stored in the reeled form. This seam can give rise to undesirable ink set off at the point of increased pressure in the reel. This can be overcome by using a cellulose acetate propionate (CAP)/acrylic white ink printed over colored ink. However, during printing, the white ink rewets the colored ink, which is undesirable. Also, set off under demanding conditions where the inks are printed in ink to ink surface contact after printing can occur.

In addition to printing shrink sleeves with CAP/Acrylic inks, vinyl polyvinyl chloride (PVC) inks may be used. These ink systems are well suited to the gravure print process that may be used to print the high quality shrink sleeve images. These ink systems provide fine reproduction and color intensity in the gravure process, and exhibit good resistance to chemicals used in the production of the shrink sleeve, such as the seam welding solvents. Also, unlike NC/PU inks, they are resistant to many of household products that are packaged in the labeled containers which are wrapped in shrink sleeve or shrink labels. However, while suited to gravure printing, CAP/Acrylic inks and vinyl PVC systems are not well suited to for use in flexographic printing, since they may damage photopolymer printing plates. Also their tonal reproduction (printability) is perceived as inferior to nitrocellulose based inks.

The trend in shrink sleeve printing may be away from rotogravure ink application toward flexographic ink application. With flexographic printing, the print quality using fine screen aniloxes and printing polymer plates can give rise to "misting" also known as "cobwebbing".

While nitrocellulose based inks, such as those described in US 2006/0246243, may be used in flexographic printing, these inks do not offer a fully satisfactory substitute for CAP/acrylic and vinyl acrylic inks. This is because as indicated above, their resistance properties are inferior.

Multipurpose ink, that is, an ink that can be printed on a number of different substrates (e.g., PET, PVC OPP, etc.) for a number of different packaged products, is a key requirement to customer efficiency and reduced complexity when printing shrinkable sleeves, shrinkable labels and other flexible packaging. In this regard, vinyl PVC-containing solvent based inks are not suitable for sensitive print surfaces such as OPS (orientated Polystyrene).

US 2006/0246243 is mentioned above. Also of interest may be:
EP1493762A1;
EP1493762B1;
JP2004238578 A2;
JP2011-148302;
JP2011-153172; and
TAGA (Proceedings of the Technical Association of the Graphic Arts): 2006, 409-418.

SUMMARY OF THE INVENTION

The subject of the present application are inventive printing inks and coating compositions comprising:
  (a) one or more elastomeric polyurethane resins with amine functionality having a glass transition temperature (Tg) of about −45° C. to about −70° C.;
  (b) one or more acrylic resins based on a methacrylate/styrene co-polymer with a Tg of about 45° C. to about 110° C.;
  (c) one or more nitrocellulose (NC) binders;
  (d) one or more solvents; and
  (e) optionally, one or more waxes and/or one or more colorants.

In another inventive aspect of the present disclosure, the one or more elastomeric polyurethane resins comprise a poly(tetrahydrofuran) (pTHF) component. In yet another aspect, the one or more elastomeric polyurethane resins comprise an isophorone diisocyanate (IPDI) component. In still another inventive aspect, the one or more elastomeric polyurethane resins comprise a pTHF component and an IPDI component. In one aspect, the colorants may be incorporated into the inks and coating compositions of the present invention in the form of a nitrocellulose (NC) binder-color concentrate.

In another inventive aspect, described is a method of formulating a printing ink or coating comprising:
  Selecting:
    (a) one or more elastomeric polyurethane resins with amine functionality having a glass transition temperature of about −45° C. to about −70° C.;
    (b) one or more acrylic resins based on a methacrylate/styrene co-polymer with a glass transition temperature of about 45° C. to about 110° C.;
    (c) one or more nitrocellulose binders;
    (d) one or more solvents; and (e) optionally, one or more waxes and/or one or more colorants;
and
formulating
components (a) to (e) into a printing ink or coating composition.

The printing ink or coating compositions described herein exhibit exceptional printability and resistance to one or more of softening, re-wetting, and set-off. The undesirable attributes associated with heretofore available ink and coating compositions, e.g., undesirable print and packaging performance and other associated problems, are minimized, if not eliminated. Furthermore, the described ink and coating compositions may be used for a wider range of flexible packaging applications such as adhesive lamination or dry lamination. The present printing ink or coating compositions overcome the problems encountered in the art that are mentioned above. Unlike other inks, the present printing ink or coating compositions are suitable for various print methods, and in particular, for gravure and flexographic printing.

DETAILED DESCRIPTION OF THE INVENTION

Figure 1:
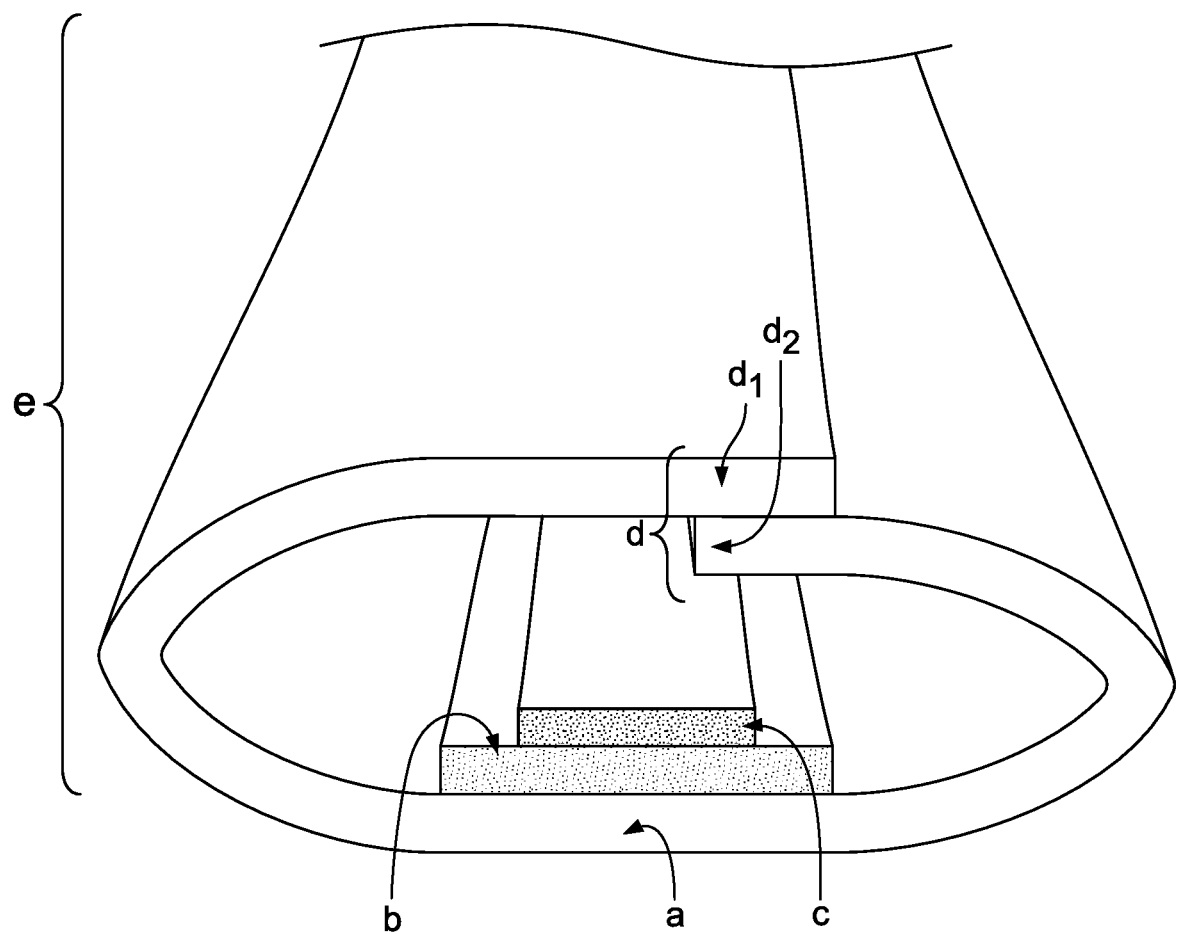
FIG. 1 is a perspective view depicting a shrink sleeve in tubular form along the longitudinal tube axis with the ends thereof arranged to overlap in a seam-forming arrangement.

The present inventors have found that the inventive ink and coating compositions described herein, which comprise:
(a) one or more elastomeric polyurethane resins with amine functionality having a Tg of about −45° C. to about −70° C.;
(b) one or more acrylic resins based on a methacrylate/styrene co-polymer with a Tg of about 45° C. to about 110° C.;
(c) one or more nitrocellulose (NC) binders;
(d) one or more solvents; and
(e) optionally, one or more waxes and/or one or more colorants, provide improved ink/coating adhesion to a substrate, notably after the substrate film, e.g., a shrink sleeve substrate, is shrunken around the container and the ink and coating composition is thereby affixed to a shrunken sleeve. The inventive ink and coating compositions also overcome problems encountered in the state of the art relating to poor product resistance and seam solvent resistance. Set-off resistance is also improved. It has been found that during printing, cobwebbing is reduced if not eliminated, providing cleaner flexographic printing.

It has further been found that not all acrylic resins that are compatible with cellulose acetate propionate (CAP) resins are compatible with polyurethane and nitrocellulose-containing ink and coating compositions. Among other reasons, this is believed to be due to poor solubility of some acrylic resins in ink and coating compositions. For example, Tables 2 and 4, infra, describe numerous ink and coating compositions containing different kinds of acrylic resins (and polyurethane resins that have and do not have amine functionality). In some instances, the acrylic resins that are employed are unsuitable because the solvent, which should be the basis of a clear and compatible solution, is often ester-based and/or ketone-based (mixtures of same may also be used). This may cause an unacceptable weakening of, for example, oriented polystyrene (OPS) shrink film, rendering it unsuitable for use. The particular polyurethane-urea resin and acrylic resin should be soluble in the selected solvent, have good flow properties, and be compatible with the nitrocellulose resin.

Ink and coating compositions having the described combination of polyurethane resins with amine functionality, acrylic resins, and nitrocellulose binder resins (e.g., having the aforementioned Tg properties and/or monomer construction) exhibit desirable adhesion as evidenced by shrink coefficient, that is, compatibility between ink, coating, and shrinkable film, both before and after the film is shrunk to conform the film to the size and contour of the article to which the film is applied. Ink adhesion to the label, both before and after shrinking, is a factor in the assessed shrink coefficient numbers.

Ink and coating compositions in accordance with the present disclosure exhibit suitable shrink coefficient (e.g., see Examples 2, 4, 10, 11 of Table 2). Certain comparative examples were found to be incompatible (e.g., Comparative Examples 8, 9, 12, 13, 14 and 15), e.g., the components thereof, e.g., the acrylic resins, are not compatible in the solvent. Further, Comparative Examples 1, 3, 5, 6, 7 and 16 failed the shrink coefficient test. Shrink coefficient accounts for the property or properties of a printed/cured ink or coating composition considered before and after the printed film is subjected to shrinkage. It is desired that the ink and coating compositions exhibit good adhesion, before and after shrinkage, which correlates to good shrink coefficient values. In the present application, shrinkage is achieved through a steam shrink test, which is described in the test methods section of the application.

In a preferred embodiment, the finished inks or coatings of the present invention, containing the combination of aforedescribed resins exhibit Tg between −45 and −70° C.; and another between 65° C. to 100° C. when using Differential Scanning calorimetry (DSC) analysis. In another preferred embodiment the finished inks of the present invention, containing the combination of 3 resin-types described above, would have a singular Tg between 25° C. and 35° C.

The elastomeric polyurethane resins having amine functionality contained the present ink and coating compositions comprise a component conferring elastomeric properties to the resin. In one aspect of the present disclosure, the inclusion of a pTHF component in the polyurethane resins confers desirable elastomeric properties upon the resins. Polyurethane resins may also include poly(propylene glycol) as a component that confers elastomeric properties upon the resins.

In one aspect, resin components (a), (b) and (c) are present in the ink and coating compositions in the following amounts: (a) about 5 wt % to about 45 wt % elastomeric polyurethane resin, more preferably about 15 wt % to about 25 wt % @ about 30 wt % to about 35 wt % non-volatile component (NVC) solids; (b) about 1 wt % to about 20 wt % acrylic resin, more preferably about 5 wt % to about 15 wt %; and (c) about 4 wt % to about 12% wt % nitrocellulose resin, more preferably about 4 wt % to about 7 wt %. These amounts reflect the amount of the above components in the ink or coating compositions.

Examples of the acrylic resins based on a methacrylate/styrene copolymer include Joncryl 581, Joncryl 587, Joncryl 678, Joncryl 682 and HSD201 (supplier: BASF Resins); and Neocryl B-819 (supplied by DSM). These resins may be used in both water- and solvent-based systems.

Examples of elastomeric polyurethane resins with amine functionality include 72S (supplier BIP Oldbury Ltd), Burnock PU-5631, 3035 (DIC DPR Performance Resins) and Neorez U-471 and U-475 (DSM). Some of these resins include PPG and/or pTHF moieties in their polymer structures. Further, some or all of them include IPDI moiety in the polymer structures.

Examples of nitrocellulose resins include DLX 3-5, DLXS-8, DLX30-50 (Nobel Industries), and A300 (Walsroder). In one aspect, the colorants may be incorporated into the inks and coating compositions of the present invention in the form of a nitrocellulose (NC) binder-color concentrate.

Suitable solvents include ethanol, n-propanol, isopropanol, denatured alcohol (e.g., trade specific denatured alcohol (TSDA)), ethoxy propanol, methoxy propanol, propoxy propanol, ethyl acetate, n-propyl acetate, isopropyl acetate, n-butyl acetate, methoxy propyl acetate, ethoxy propyl acetate, methoxy propoxy propanol glycol ether, propanol butoxy glycol ether, methoxy butanol glycol ether, ethyl lactate, and mixtures thereof.

Suitable colorants include but are not limited to organic or inorganic pigments and dyes. Exemplary dyes include azo dyes, anthraquinone dyes, xanthene dyes, azine dyes, combinations thereof and the like. Exemplary organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Exemplary inorganic pigments include iron oxides, titanium dioxides, chromium oxides, ferric ammonium ferrocyanides, ferric oxide blacks, Pigment Black Number 7 and/or Pigment White Numbers 6 and 7. Aluminum- and mica-based pigments may also be used. Other organic and inorganic pigments and dyes can also be employed, as well as combinations that achieve the colors desired.

Turning to FIG. 1, shown is a perspective view of a shrink sleeve (e) in tubular form with the ends (d1), (d2) of shrinkable substrate (a) arranged to overlap. A seam-sealing composition (not shown), may be applied to one or both of facing sides (d1), (d2) in order to form a bond in the seam (d). Color ink layer (b) and white ink layer (c) are printed on interior of shrinkable substrate (a). In the state of the art inks and coatings (i.e., prior to the present inventive ink and coating formulations), contact between points (b), (c) and (d) caused ink softening, removal and setting-off after storage on a reel. The present ink and coating compositions provide much better resistance and avoid the potentially adverse effects at the contact points.

Figure 2:
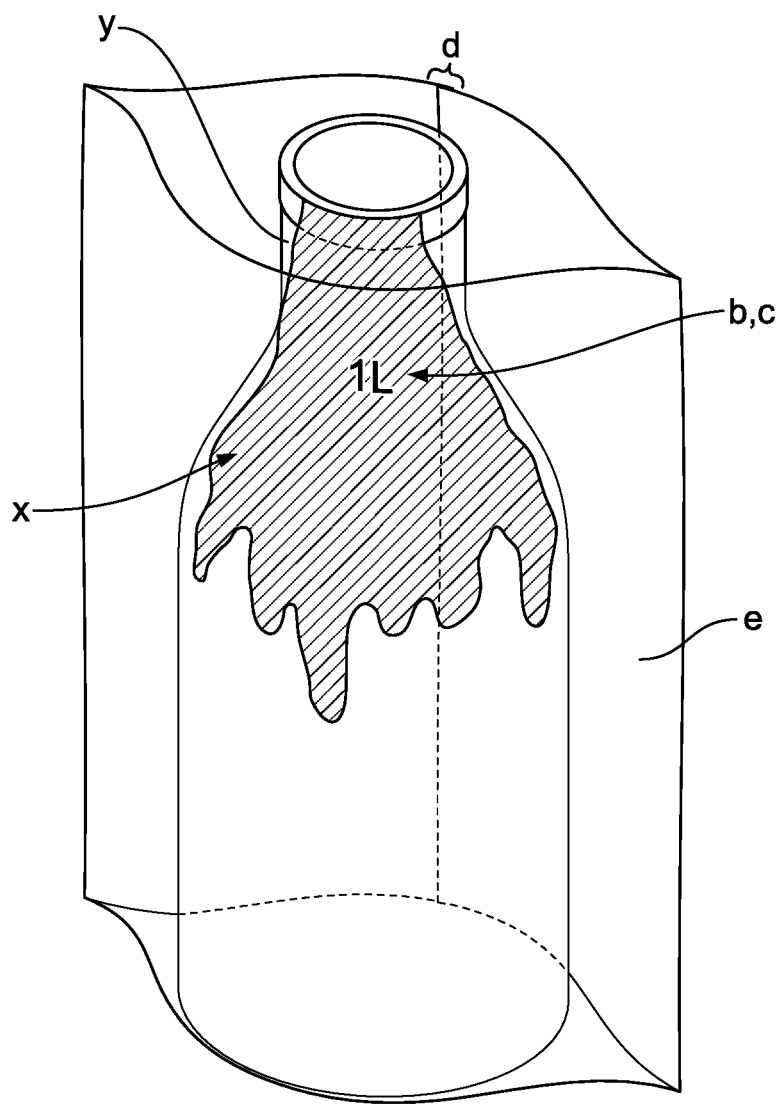
FIG. 2 is a perspective view depicting shrink sleeve arranged over a container.

Turning to FIG. 2, shrink sleeve (e) is depicted over container (y), with container contents (x) spilling out of the container. The contents are shown seeping into the space between container (y) and sleeve (e). In the state of the art (i.e., prior to the present inventive ink and coating formulations), the spilled contents could degrade the ink layers (b), (c) printed on the inner side of the sleeve, shown here as forming the container volume indication "1 L" (e). This could cause state of the art inks to leach out of the layers and commingle with the spilled product contents (x). The present ink and coating compositions provide much better resistance and avoid the potentially adverse effects of such ink and container content interactions, such as, for example, providing better chemical resistance, thereby minimizing if not eliminating the undesirable leeching/commingling effect.

The following examples illustrate specific aspects of the present invention and are not intended to limit the scope thereof in any respect and should not be so construed.

EXAMPLES

Test Methods:
Tape Adhesion

Adhesive Tape (Scotch Tape 610 from 3M) is stuck on top of a proof print of the ink using finger pressure, and is then pulled off manually. Print evaluated level of ink removal. (ASTM F2252). A score of 5 is considered a pass. A score of 1 or 3 is considered a fail.

Fingernail Adhesion

Proof print is laid print-side up on a hard surface and back of index fingernail scratch across surface. Print evaluated for level of ink removal. A score of 5 is considered a pass. A score of 1 or 3 is considered a fail.

Wrinkle Test

The proof print is grasped with thumb and forefinger at either side of print, hands approx. 1" apart, and rotated vigorously for 20 cycles to simulate repeated flexing of print. The level of ink removal and/or damage to print surface is assessed. A score of 5 is considered a pass. A score of 1 or 3 is considered a fail.

Steam Shrink Test

The print is placed in a steam sterilizer (bottle sterilizer) to fully shrink it; ordinarily this occurs in about 2 to about 4 minutes. The print is then dried using a paper cloth and evaluated for tape adhesion, scratch resistance and wrinkle test for level of ink removal. A score of 5 is considered a pass. A score of 1 or 3 is considered a fail.

Ink samples were produced by mixing the ink components with a bladed laboratory paddle stirrer (100 rpm) adding the materials in order by weight in accordance with the formulations described in Tables 1 and 2. Test samples were reduced to printing viscosity 18 seconds DIN4 with solvent reducer (alcohol/ester blend 4:1 ratio). Proofs were produced using wirewound K-Bar (9 micron) onto various shrink film substrates available typically from Gunze, Klockner Pentaplast. The shrink sleeve films may be polyvinylchloride, polyesters, polyethylene terephthalate (PET), glycol-modified polyesters including polyethylene terephthalate glycol (PETG), oriented polystyrene (OPS) and polypropylene. Prints were dried at room temperature (25° C., RH 50%). Tests were performed pre-shrink to assess adhesion, wrinkle resistance, fingernail scratch resistance and non-blocking tendency. Shrink coefficient values were assessed. Prints were then folded and seamed using solvent to weld the film together to make a sleeve or tube. Tubes were place over glass containers and the sleeves were shrunk using steam. The sleeves were evenly shrunk using steam generated from a bottle sterilizer. Further tests were carried out on the prints when removed from the glass containers. Shrink coefficient values were assessed. Adhesion was measured by the industry standard method using self-adhesive tape Scotch 610 placed over the printed ink surface before and after shrinkage according to ASTM F2252. See Tables 1 and 2 for results.

Example 1 (Comparative)

Into a solution of 7 wt % DLX 3-5 nitrocellulose resin in ethanol (Nobel), 25 wt % pigment B15:4 (DIC Fastogen) is milled to form a color concentrate (hereinafter, the "color concentrate"). The color concentrate is let down with an acrylic resin varnish including 40 wt % solids (Joncryl 581

(BASF)) with 60 wt % solvent, incorporated at 12.5 wt % into the above to give 5 wt % solids. Polyethylene (PE) wax from Shamrock Technologies is dispersed in the above using a high speed shear mixer. To the above, ethanol and n-propyl acetate are added and mixed to provide a 100 wt % formulation.

The composition of Example 1 does not include an elastomeric polyurethane resin with amine functionality with Tg between −45 to −70° C. Thus Example 1 is comparative.

Example 2 (Inventive)

The color concentrate of Example 1 was prepared, and then let down with 24.5 wt % elastomeric polyurethane from DIC under the trade name of Burnock. An acrylic resin varnish including 40 wt % solids (Joncryl 587 (BASF)) with 60 wt % solvent is incorporated at 18.8 wt % into the above to give 7.5 wt % solids. PE wax from Shamrock Technologies is dispersed using a high speed shear mixer. To the above, ethanol and n-propyl acetate are added and mixed to provide a 100 wt % formulation.

Example 2 includes (a) an elastomeric polyurethane resin with amine functionality having Tg between −45 to −70° C.; (b) an acrylic resin based on a methacrylate/styrene co-polymer with Tg between 45 to 110° C.; and (c) nitrocellulose binder.

Example 3 (Comparative)

The color concentrate of Example 1 was prepared, and then let down with 18.2 wt % elastomeric polyurethane from BIP Oldbury Limited under the trade name of Surkofilm 72s. An acrylic resin varnish including 40 wt % (Joncryl 682 (BASF)) with 60 wt % solvent is incorporated at 18.8 wt % into the above to give 7.5 wt % solids. A polyethylene (PE) wax from Shamrock Technologies is dispersed using a high speed shear mixer. To the above, ethanol and n-propyl acetate are added and mixed to provide a 100 wt % formulation.

Example 3 is comparative due to the absence of elastomeric polyurethane resin with amine functionality based with Tg between −45 to −70° C. The elastomeric polyurethane does not have amine functionality.

Example 4 (Inventive)

The color concentrate of Example 1 was prepared, and then let down with 24.5 wt % Burnock PU5631, an elastomeric polyurethane resin from DIC. An acrylic resin varnish including 40 wt % solids (Neocryl B-819 (DSM)) with 60 wt % solvent is incorporated into the above at 25 wt % to give 10 wt % solids. PE wax from Shamrock Technologies is dispersed using a high speed shear mixer. To the above, ethanol and n-propyl acetate are added and mixed to provide a 100 wt % formulation.

Example 4 includes (a) an elastomeric polyurethane resin with amine functionality having Tg between −45 to −70° C.; (b) acrylic resin based on a methacrylate/styrene co-polymer with Tg between 45 to 110° C.; and (c) nitrocellulose binder. Example 4 is inventive.

Example 5 (Comparative)

The color concentrate of Example 1 was prepared, and then let down with 20.0 wt % Neorez u-471, an elastomeric polyurethane available from DSM. PE wax from Shamrock Technologies is dispersed using a high speed shear mixer. To the above, ethanol and n-propyl acetate are added and mixed to provide a 100 wt % formulation.

Example 5 is comparative due to the absence of elastomeric polyurethane resin with amine functionality with Tg between −45 to −70° C.; and the absence of acrylic resin based on a methacrylate/styrene co-polymer with Tg between 45 to 110° C.

Example 6 (Comparative)

The color concentrate of Example 1 was prepared, and then let down with 13.0 wt % Thermoplastic Polyurethane from BIP under the trade name of Surkopak 5244. An acrylic resin varnish including 40 wt % solids (Neocryl B-890 (DSM)) with 60 wt % solvent is incorporated into the above at 25 wt % to give 10 wt % solids. PE wax from Shamrock Technologies is dispersed using a high speed shear mixer. To the above, ethanol and n-propyl acetate are added and mixed to provide a 100% formulation.

Example 6 employs thermoplastic polyurethane. It does not include an elastomeric polyurethane resin with amine functionality having Tg between −45 to −70° C. Also, while Example 6 includes an acrylic resin, this resin is not based on a methacrylate/styrene co-polymer with Tg between 45 to 110° C. Thus, Example 6 is comparative.

Example 7 (Comparative)

The color concentrate of Example 1 was prepared, and then let down by incorporating an acrylic resin varnish including 40 wt % solids (Neocryl B-890 (DSM)) with 60 wt % solvent at 50 wt % into the above to give 20 wt % solids. PE wax from Shamrock Technologies is dispersed into the above using a high speed shear mixer. To the above, ethanol and n-propyl acetate are added and mixed to provide a 100 wt % formulation.

Example 7 is comparative due to the absence of an elastomeric polyurethane resin with amine functionality having Tg between −45 to −70° C.; and the absence of an acrylic resin based on a methacrylate/styrene co-polymer with Tg between 45 to 110° C. (Neocryl B-890 is not based on a methacrylate/styrene co-polymer).

Example 8 (Comparative)

The color concentrate of Example 1 was prepared, and then let down with 32.6 wt % Burnock PU5631, an elastomeric polyurethane from DIC. An acrylic resin varnish including 40 wt % solids of Lucite resin sold under the trade name Elvacite 2013 with 60 wt % solvent is incorporated at 12.5 wt % into the above to give 5 wt % solids. PE wax from Shamrock Technologies is dispersed using a high speed shear mixer. To the above, ethanol and n-propyl acetate are added and mixed to provide a 100 wt % formulation.

Example 8 is comparative due to the absence of acrylic resin based on a methacrylate/styrene co-polymer with Tg between 45 to 110° C. (Elvacite 2013 is not based on a methacrylate/styrene co-polymer).

Example 9 (Comparative)

The color concentrate of Example 1 was prepared, and then let down with 36.0 wt % Elastomeric Polyurethane from BIP under the trade name of Surkofilm 72s. An acrylic resin varnish including 40 wt % solids (Paraloid B72 (Rohm & Haas)) with 60 wt % solvent is incorporated and mixed into the above at 6.25 wt % to give 2.5 wt % solids. PE wax from Shamrock Technologies is dispersed using a high speed shear mixer. To the above, ethanol and n-propyl acetate are added and mixed to provide a 100 wt % formulation.

Example 9 is comparative due to the absence of an elastomeric polyurethane resin with amine functionality having Tg between −45 to −70° C. (Surkofilm 72S does not have amine functionality); and the absence of an acrylic resin based on a methacrylate/styrene co-polymer with Tg between 45 to 110° C. (Paraloid B72 is not based on a methacrylate/styrene co-polymer).

Example 10 (Inventive)

The color concentrate of Example 1 was prepared, and then let down with 24.5 wt % Burnock PU563, an elastomeric polyurethane resin from DIC. An acrylic resin varnish including 40 wt % solids (Joncryl 678 (BASF)) with 60 wt % solvent is incorporated at 25 wt % into the above to give 10 wt % solids. PE wax from Shamrock Technologies is dispersed using a high speed shear mixer. To the above, ethanol and n-propyl acetate are added and mixed to provide a 100 wt % formulation.

Example 10 is inventive due to the inclusion of an elastomeric polyurethane resin with amine functionality having Tg between −45 to −70° C.; (b) an acrylic resin based on a methacrylate/styrene co-polymer with Tg between 45 to 110° C.; and (c) a nitrocellulose binder.

Example 11 (Inventive)

The color concentrate of Example 1 was prepared, and then let down with 17.5 wt % Burnock PU3035, an elastomeric polyurethane resin from DIC. An acrylic resin varnish including 40 wt % solids (Joncryl 682 (BASF)) with 60 wt % solvent is incorporated at 12.5 wt % into the above to give 5 wt % solids. PE wax from Shamrock Technologies is dispersed using a high speed shear mixer. To the above, ethanol and n-propyl acetate are added and mixed to provide a 100 wt % formulation.

Example 11 is inventive due to the inclusion of an elastomeric polyurethane resin with amine functionality having Tg between −45 to −70° C.; (b) an acrylic resin based on a methacrylate/styrene co-polymer with Tg between 45 to 110° C.; and (c) nitrocellulose binder.

Table 3 lists Comparative Examples 12-16, in which at least one of the materials has Tg not within the appropriate specified range.

Example 12 (Comparative)

The color concentrate of Example 1 was prepared, and then let down with 20 wt % elastomeric polyurethane from Coim under the trade name of Novacote AP-1220. An acrylic resin varnish including 40 wt % solids (Neocryl B-804 (DSM)) with 60 wt % solvent is incorporated and mixed at 20 wt % into the above to give 8 wt % solids. PE wax from Shamrock Technologies is dispersed using a high speed shear mixer. To the above, ethanol and n-propyl acetate are added and mixed to provide a 100 wt % formulation.

Example 12 is comparative due to the elastomeric polyurethane resin with amine functionality having Tg above −45° C., and an acrylic resin (methacrylate co-polymer) having Tg not in the specified range of 45° C. to 110° C. Further, the methacrylate co-polymer resin does not contain styrene moieties.

Example 13 (Comparative)

The color concentrate of Example 1 was prepared, and then let down with 20 wt % elastomeric polyurethane resin from DIC under the trade name Burnock 5631. An acrylic resin varnish including 40 wt % solids (Degalan PM555 (Evonik)) with 60 wt % solvent is incorporated and mixed in at 20 wt % into the above to give 8 wt % solids. PE wax from Shamrock Technologies is dispersed using a high speed shear mixer. To the above, ethanol and n-propyl acetate are added and mixed to provide a 100 wt % formulation.

Example 13 is comparative due to the absence of acrylic resin that is based on methacrylate/styrene co-polymer with Tg in the specified range between 45° C. to 110° C.

Example 14 (Comparative)

The color concentrate of Example 1 was prepared, and then let down with 20 wt % elastomeric polyurethane resin from DIC under the trade name Burnock 5631. An acrylic resin varnish including 40 wt % solids (Degalan LP50/02 (Evonik)) with 60 wt % solvent is incorporated and mixed at 20 wt % into the above to give 8 wt % solids. PE wax from Shamrock Technologies is dispersed using a high speed shear mixer. To the above, ethanol and n-propyl acetate are added and mixed to provide a 100 wt % formulation.

Example 14 is comparative due to the absence of an acrylic resin that is based on a methacrylate/styrene co-polymer with Tg between 45° C. to 110° C.

Example 15 (Comparative)

The color concentrate of Example 1 was prepared, and then let down with 20 wt % elastomeric polyurethane resin from DIC under the trade name Burnock 5631. An acrylic resin varnish including 40 wt % solids (Neocryl B-804 (DSM)) with 60 wt % solvent is incorporated at 20 wt % and mixed into the above to give 8 wt % solids. PE wax from Shamrock Technologies is dispersed using a high speed shear mixer. To the above, ethanol and n-propyl acetate are added and mixed to provide a 100 wt % formulation.

Example 15 is comparative due to the absence of an acrylic resin that is based on methacrylate/styrene co-polymer with Tg in the Inventive range between 45° C. to 110° C.

Example 16 (Comparative)

The color concentrate of Example 1 was prepared, and then let down with 12.3 wt % elastomeric polyurethane resin from Coim under the trade name of Novacoat AP1220. An acrylic resin varnish including 40 wt % solids (Joncryl 682 (BASF)) with 60 wt % solvent is incorporated at 20.0 wt % and mixed into the above to give 8 wt % solids. PE wax from Shamrock Technologies is dispersed using a high speed shear mixer. To the above, ethanol and n-propyl acetate are added and mixed to provide a 100 wt % formulation.

Example 16 is comparative due to the elastomeric polyurethane/urea resin having Tg above −45° C.

TABLE 1

Ink Formulations

| | Resin/Description | Tg (° C.) | Example 1 (Comp.) | Example 2 (Inv.) | Example 3 (Comp.) | Example 4 (Inv.) | Example 5 (Comp.) | Example 6 (Comp.) |
|---|---|---|---|---|---|---|---|---|
| NC color conc. | NC/Pigment | | 50.0 | 50.0 | 50.0 | 50.0 | 50.0 | 50.0 |
| Surkopak 5244 | TPU | −55 | | | | | | 13.0 |
| Surkofilm 72s | EPU (not amine functional) | −55 | | | 18.2 | | | |
| Neo-Rez u-471 | EPU (not amine lunctional) | −60 | | | | | 20.0 | |
| Burnock pu5631 | EPU (amine functional) | −65 | | 24.5 | | 24.5 | | |
| Burnock pu3035 | EPU (amine functional) | −70 | | | | | | |
| Joncryl 581 | Acrylic (methacrylate/styrene co-polymer) | 62 | 5.0 | | | | | |
| Joncryl 587 | Acrylic (methacrylate/styrene co-polymer) | 57 | | 7.5 | | | | |
| Neocryl B-819 | Acrylic (methacrylate/styrene co-polymer) | 49 | | | | 10.0 | | |
| Neocryl B-890 | Acrylic (no styrene polymer) | 70 | | | | | | 10.0 |
| Paraloid B72 | Acrylic (no styrene polymer) | 40 | | | | | | |
| Elvacite 2013 | Acrylic (no styrene polymer) | 76 | | | | | | |
| Joncryl 682 | Acrylic (methacrylate/styrene co-polymer) | 57 | | | | 7.5 | | |
| Joncryl 678 | Acrylic (methacrylate/styrene co-polymer) | 101 | | | | | | |
| Shamrock PE | Wax Powder | | 1.2 | 1.2 | 1.2 | 1.2 | 1.2 | 1.2 |
| Ethanol/TSDA | Solvent | | 13.3 | 6.9 | 2.1 | 5.9 | 2.8 | 4.6 |
| n-Propyl Acetate | Solvent | | 30.5 | 9.9 | 21.0 | 8.4 | 26.0 | 21.2 |
| Total | | | 100.0 | 100.0 | 100.0 | 100.0 | 100.0 | 100.0 |

| | Resin/Description | Example 7 (Comp.) | Example 8 (Comp.) | Example 9 (Comp.) | Example 10 (Inv.) | Example 11 (Inv.) |
|---|---|---|---|---|---|---|
| NC color conc. | NC/Pigment | 50.0 | 50.0 | 50.0 | 50.0 | 50.0 |
| Surkopak 5244 | TPU | | | | | |
| Surkofilm 72s | EPU (not amine functional) | | | 36.0 | | |
| Neo-Rez u-471 | EPU (not amine lunctional) | | | | | |
| Burnock pu5631 | EPU (amine functional) | | 32.6 | | 24.5 | |
| Burnock pu3035 | EPU (amine functional) | | | | | 17.5 |
| Joncryl 581 | Acrylic (methacrylate/styrene co-polymer) | | | | | |
| Joncryl 587 | Acrylic (methacrylate/styrene co-polymer) | | | | | |
| Neocryl B-819 | Acrylic (methacrylate/styrene co-polymer) | | | | | |
| Neocryl B-890 | Acrylic (no styrene polymer) | 20.0 | | | | |
| Paraloid B72 | Acrylic (no styrene polymer) | | | | 2.5 | |
| Elvacite 2013 | Acrylic (no styrene polymer) | | 5.0 | | | |
| Joncryl 682 | Acrylic (methacrylate/styrene co-polymer) | | | | | 5.0 |
| Joncryl 678 | Acrylic (methacrylate/styrene co-polymer) | | | | 10.0 | |
| Shamrock PE | Wax Powder | 1.2 | 1.2 | 1.2 | 1.2 | 1.2 |
| Ethanol/TSDA | Solvent | 4.3 | 7.4 | 0.0 | 5.9 | 18.0 |
| n-Propyl Acetate | Solvent | 24.5 | 3.8 | 10.3 | 8.4 | 8.3 |
| Total | | 100.0 | 100.0 | 100.0 | 100.0 | 100.0 |

TPU = Thermoplastic Polyurethane
EPU = Elastomeric Polyurethane

TABLE 2

Adhesion/Shrink Coefficient

| | | Before Shrinkage | | | | | | | | | | | |
|---|---|---|---|---|---|---|---|---|---|---|---|---|---|
| | | Adhesion (Scotch Tape 610) | | | | Scratch (Fingernail) | | | | Wrinkle | | | |
| | Solubility | OPP | PET | PVC | OPS | OPP | PET | PVC | OPS | OPP | PET | PVC | OPS |
| Example 01 (Comp.) | C | 1 | 5 | 1 | 3 | 5 | 5 | 5 | 5 | 5 | 5 | 5 | 5 |
| Example 02 (Inv.) | C | 5 | 5 | 5 | 5 | 5 | 5 | 5 | 5 | 5 | 5 | 5 | 5 |
| Example 03 (Comp.) | C | 5 | 5 | 5 | 5 | 5 | 5 | 5 | 5 | 5 | 5 | 5 | 5 |
| Example 04 (Inv.) | C | 5 | 5 | 5 | 5 | 5 | 5 | 5 | 5 | 5 | 5 | 5 | 5 |
| Example 05 (Comp.) | C | 5 | 5 | 1 | 3 | 5 | 5 | 5 | 5 | 5 | 5 | 5 | 5 |
| Example 06 (Comp.) | C | 5 | 5 | 1 | 3 | 5 | 5 | 5 | 5 | 5 | 5 | 5 | 5 |
| Example 07 (Comp.) | C | 5 | 5 | 1 | 5 | 5 | 5 | 5 | 5 | 5 | 5 | 5 | 5 |
| Example 08 (Comp.) | I | NA | NA | NA | NA | NA | NA | NA | NA | NA | NA | NA | NA |
| Example 09 (Comp.) | I | NA | NA | NA | NA | NA | NA | NA | NA | NA | NA | NA | NA |

TABLE 2-continued

| | Adhesion/Shrink Coefficient | | | | | | | | | | | | |
|---|---|---|---|---|---|---|---|---|---|---|---|---|---|
| Example 10 (Inv.) | C | 5 | 5 | 5 | 5 | 5 | 5 | 5 | 5 | 5 | 5 | 5 | 5 |
| Example 11 (Inv.) | C | 5 | 5 | 5 | 5 | 5 | 5 | 5 | 5 | 5 | 5 | 5 | 5 |

| | After Steam Shrinkage | | | | | | | | | | | |
|---|---|---|---|---|---|---|---|---|---|---|---|---|
| | Adhesion (Scotch Tape 610) | | | | Scratch (Fingernail) | | | | Wrinkle | | | |
| | OPP | PET | PVC | OPS | OPP | PET | PVC | OPS | OPP | PET | PVC | OPS |
| Example 01 (Comp.) | 1 | 1 | 1 | 1 | 1 | 1 | 1 | 1 | 1 | 1 | 1 | 1 |
| Example 02 (Inv.) | 5 | 5 | 5 | 5 | 5 | 5 | 5 | 5 | 5 | 5 | 5 | 5 |
| Example 03 (Comp.) | 1 | 5 | 1 | 5 | 1 | 5 | 1 | 3 | 3 | 5 | 1 | 5 |
| Example 04 (Inv.) | 5 | 5 | 5 | 5 | 5 | 5 | 5 | 5 | 5 | 5 | 5 | 5 |
| Example 05 (Comp.) | 1 | 5 | 1 | 3 | 1 | 5 | 1 | 3 | 3 | 1 | 1 | 3 |
| Example 06 (Comp.) | 1 | 1 | 1 | 1 | 1 | 1 | 1 | 1 | 1 | 1 | 1 | 1 |
| Example 07 (Comp.) | 1 | 5 | 1 | 3 | 1 | 5 | 3 | 5 | 1 | 5 | 3 | 5 |
| Example 08 (Comp.) | NA | NA | NA | NA | NA | NA | NA | NA | NA | NA | NA | NA |
| Example 09 (Comp.) | NA | NA | NA | NA | NA | NA | NA | NA | NA | NA | NA | NA |
| Example 10 (Inv.) | 5 | 5 | 5 | 5 | 5 | 5 | 5 | 5 | 5 | 5 | 5 | 5 |
| Example 11 (Inv.) | 5 | 5 | 5 | 5 | 5 | 5 | 5 | 5 | 5 | 5 | 5 | 5 |

Solubility:
C = Compatible
I = Incompatible
Adhesion:
5 = Pass Full Ink Adhesion, >90%
3 = Partial Fail Ink Adhesion, ~50% Removal
1 = Fail, No Ink Adhesion, ~100% Removal
NA = Not applicable.
These examples were not tested further due to incompatibility.

TABLE 3

| | | | Further Comparative Ink Formulations | | | | |
|---|---|---|---|---|---|---|---|
| | | Tg | Comparative Example 12 | Comparative Example 13 | Comparative Example 14 | Comparative Example 15 | Comparative Example 16 |
| NC Color conc. | NC/pigment | — | 50.0 | 50.0 | 50.0 | 50.0 | 50.0 |
| Novacote AP1220 | elastomeric amine functional polyurethane urea | −34 | 20.0 | | | | 12.3 |
| Burnock PU5631 | elastomeric amine functional polyurethane urea | −65 | | 20.0 | 20.0 | 20.0 | |
| Neocryl B804 | Acrylic (non-styrenated) | 33 | 8.0 | | | 8.0 | |
| Degalan PM555 | Acrylic (non-styrenated) | −43 | | 8.0 | | | |
| Degalan LP 50/02 | Acrylic (non-styrenated) | 115 | | | 8.0 | | |
| Joncryl 682 | Acrylic (methacrylate/styrene co-polymer) | 57 | | | | | 10.0 |
| Shamrock PE | Wax powder | | 1.2 | 1.2 | 1.2 | 1.2 | 1.2 |
| Ethanol/TSDA | solvent | | 5.5 | 14.0 | 14.0 | 14.0 | 10.5 |
| Normal Propyl acetate | solvent | | 15.3 | 6.8 | 6.8 | 6.8 | 16.0 |
| Total | | | 100 | 100 | 100 | 100 | 100 |

TABLE 4

| | Adhesion/Shrink Coefficient | | | | | | | | | | | | |
|---|---|---|---|---|---|---|---|---|---|---|---|---|---|
| | Before Shrinkage | | | | | | | | | | | | |
| | | Adhesion (Scotch Tape 610) | | | | Scratch (Fingernail) | | | | Wrinkle | | | |
| | Solubility | OPP | PET | PVC | OPS | OPP | PET | PVC | OPS | OPP | PET | PVC | OPS |
| Example 12 (Comp.) | I | N/A | N/A | N/A | N/A | N/A | N/A | N/A | N/A | N/A | N/A | N/A | N/A |
| Example 13 (Comp.) | I | N/A | N/A | N/A | N/A | N/A | N/A | N/A | N/A | N/A | N/A | N/A | N/A |
| Example 14 (Comp.) | I | N/A | N/A | N/A | N/A | N/A | N/A | N/A | N/A | N/A | N/A | N/A | N/A |

TABLE 4-continued

| | | Adhesion/Shrink Coefficient | | | | | | | | | | | |
|---|---|---|---|---|---|---|---|---|---|---|---|---|---|
| Example 15 (Comp.) | I | N/A | N/A | N/A | N/A | N/A | N/A | N/A | N/A | N/A | N/A | N/A | N/A |
| Example 16 (Comp.) | C | 5 | 5 | 1 | 1 | 5 | 5 | 5 | 5 | 5 | 5 | 3 | 5 |

| | After Steam Shrinkage | | | | | | | | | | | |
|---|---|---|---|---|---|---|---|---|---|---|---|---|
| | Adhesion (Scotch Tape 610) | | | | Scratch (Fingernail) | | | | Wrinkle | | | |
| | OPP | PET | PVC | OPS | OPP | PET | PVC | OPS | OPP | PET | PVC | OPS |
| Example 12 (Comp.) | N/A | N/A | N/A | N/A | N/A | N/A | N/A | N/A | N/A | N/A | N/A | N/A |
| Example 13 (Comp.) | N/A | N/A | N/A | N/A | N/A | N/A | N/A | N/A | N/A | N/A | N/A | N/A |
| Example 14 (Comp.) | N/A | N/A | N/A | N/A | N/A | N/A | N/A | N/A | N/A | N/A | N/A | N/A |
| Example 15 (Comp.) | N/A | N/A | N/A | N/A | N/A | N/A | N/A | N/A | N/A | N/A | N/A | N/A |
| Example 16 (Comp.) | 5 | 5 | 1 | 1 | 5 | 5 | 1 | 1 | 3 | 5 | 1 | 1 |

Solubility:
C = Compatible
I = Incompatible
Adhesion:
5 = Pass Full Ink Adhesion, >90%
3 = Partial Fail Ink Adhesion, ~50% Removal
1 = Fail, No Ink Adhesion, ~100% Removal
NA = Not applicable.
These examples were not tested further due to incompatibility.

Summary of Table 2:

Examples 2, 4, 10 & 11 shows that the resin combinations in these samples produce an ink that is stable and gives the required ink film properties before and after the steam shrinking tests are completed on various filmic substrates.

Examples 1, 3, 5, 6 and 7 shows that these resins, although compatible, give a mixed performance for adhesion that can be seen on various filmic substrates films prior to steam shrinking. After steam shrinking the ink film properties of adhesion, scratch and wrinkle on all films shows various degrees of failure.

Examples 8 and 9 are shown to be incompatible when mixed, producing a solution with poor flow and instability between resin solutions. These resins used do not contain a methacrylate/styrene co-polymer.

Solubility of some Comparative Examples mixtures is poor (see Table 2, Examples 8 and 9 and Table 4, Examples 12, 13, 14, 15), leading to incompatibility issues observed by the cloudy/hazing of mixtures giving rise to phase separation and poor homogeneity. This causes undesirable effects on the print process including poor adhesion to substrate, lack of film formation, and undesirable matting effect. Examples exhibiting incompatibility were not tested further.

Summary of Table 4:

Examples 12, 13, 14, and 15 shown to be incompatible when mixed, producing a solution with poor flow and instability between resin solutions.

Example 16 shows that these resins, although compatible, give a mixed performance for adhesion that can be seen on various filmic substrates films prior to steam shrinking. After steam shrinking, the ink film properties of adhesion, scratch and wrinkle on all films shows various degrees of failure.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A printing ink or coating composition comprising
   (a) one or more elastomeric polyurethane resins with amine functionality having a glass transition temperature of about −45° C. to about −70° C.;
   (b) one or more acrylic resins based on a methacrylate/styrene co-polymer with a glass transition temperature of about 45° C. to about 110° C.;
   (c) one or more nitrocellulose binders;
   (d) one or more solvents; and
   (e) optionally, one or more waxes and/or one or more colorants,
   wherein the nitrocellulose binders are present in an amount of about 4 wt % to about 12 wt %.

2. The printing ink or coating composition of claim 1, wherein the elastomeric polyurethane resins with amine functionality comprise a poly(tetrahydrofuran) component.

3. The printing ink or coating composition of claim 1, wherein the elastomeric polyurethane resins with amine functionality comprise an isophorone diisocyanate component.

4. The printing ink or coating composition of claim 1, wherein the elastomeric polyurethane resins with amine functionality comprise a poly(tetrahydrofuran) component and an isophorone diisocyanate component.

5. The printing ink or coating composition of claim 1, wherein the elastomeric polyurethane resins with amine functionality comprise a poly(propylene glycol) component.

6. The printing ink or coating composition of claim 1, wherein the colorant is present in a nitrocellulose binder color concentrate.

7. The printing ink or coating composition of claim 1, wherein the solvent is selected from ethanol, n-propanol, isopropanol, ethoxy propanol, methoxy propanol, propoxy propanol, ethyl acetate, n-propyl acetate, isopropyl acetate, n-butyl acetate, methoxy propyl acetate, ethoxy propyl acetate, methoxy propoxy propanol glycol ether, propanol butoxy glycol ether, methoxy butanol glycol ether, ethyl lactate, and mixtures thereof.

8. The printing ink or coating composition of claim 1, wherein the elastomeric polyurethane resins with amine functionality are present in an amount of about 5 wt % to about 45 wt %.

9. The printing ink or coating composition of claim 1, wherein the acrylic resins are present in an amount of about 1 wt % to about 20 wt %.

10. The printing ink or coating composition of claim 1, wherein the nitrocellulose resins are present in an amount of about 4 wt % to about 7 wt %.

11. The printing ink or coating composition of claim 1, wherein the printing ink or coating composition has a glass transition temperature in a first region of about −45° C. to about −70° C. and a glass transition temperature in a second region of about 65° C. to about 100° C.

12. The printing ink or coating composition of claim 1, wherein the printing ink or coating composition has a glass transition temperature of about 25° C. to about 35° C.

13. The printing ink or coating composition of claim 1, wherein the printing ink or coating composition is a gravure or flexographic ink or coating composition.

14. A shrinkable sleeve, shrink label and other flexible packaging applied with the printing ink or coating composition of claim 1.

15. A printed article, comprising a substrate and the printing ink or coating composition of claim 1.

16. A method of formulating a printing ink or coating comprising:
selecting
(a) one or more elastomeric polyurethane resins with amine functionality having a glass transition temperature of about −45° C. to about −70° C.;
(b) one or more acrylic resins based on a methacrylate/styrene co-polymer with a glass transition temperature of about 45° C. to about 110° C.;
(c) one or more nitrocellulose binders;
(d) one or more solvents; and
(e) optionally, one or more waxes and/or one or more colorants; and
formulating components (a) to (e) into a printing ink or coating composition.

17. The printing ink or coating composition of claim 1, wherein the elastomeric polyurethane resins with amine functionality are present in amount of about 15 wt % to about 25 wt %.

18. The printing ink or coating composition of claim 1, wherein the acrylic resins are present in an amount of about 5 wt % to about 15 wt %.

19. A printing ink or coating composition comprising
(a) from about 5 wt % to about 45 wt % of one or more elastomeric polyurethane resins with amine functionality having a glass transition temperature of about −45° C. to about −70° C.;
(b) from about 1 wt % to about 20 wt % of one or more acrylic resins based on a methacrylate/styrene co-polymer with a glass transition temperature of about 45° C. to about 110° C.;
(c) from about 4 wt % to about 12 wt % of one or more nitrocellulose binders;
(d) one or more solvents; and
(e) optionally, one or more waxes and/or one or more colorants.

* * * * *